United States Patent
Garrett et al.

(10) Patent No.: US 11,174,905 B1
(45) Date of Patent: Nov. 16, 2021

(54) CLUTCH HYDRAULIC CONTROL CIRCUIT WITH A PILOT OPERATED FAILURE MODE RESPONSE VALVE

(71) Applicant: Caterpillar Inc., Peoria, IL (US)

(72) Inventors: Konrad Garrett, Pekin, IL (US); Aaron Benjamin Crabtree, Metamora, IL (US); Michael David Beyer, Chillicothe, IL (US); Gaurav Vasudeva, Dunlap, IL (US); Brian Eugene Lister, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/101,173

(22) Filed: Nov. 23, 2020

(51) Int. Cl.
 *F16D 48/02* (2006.01)
 *F16H 61/12* (2010.01)
 *F16H 61/28* (2006.01)

(52) U.S. Cl.
 CPC ......... *F16D 48/0206* (2013.01); *F16D 25/14* (2013.01); *F16H 61/12* (2013.01); *F16H 61/2807* (2013.01); *F16D 2048/0221* (2013.01); *F16D 2500/1027* (2013.01); *F16D 2500/501* (2013.01); *F16H 2061/1236* (2013.01); *F16H 2061/1256* (2013.01)

(58) Field of Classification Search
 CPC .......... F16D 48/0206; F16D 25/14; F16D 2048/0221; F16D 2500/1027; F16D 2500/501; F16H 61/2807; F16H 61/12; F16H 2061/1236; F16H 2061/1256
 See application file for complete search history.

(56) References Cited

U.S. PATENT DOCUMENTS

| 4,838,126 | A | 6/1989 | Wilfinger et al. |
| 6,647,328 | B2 | 11/2003 | Walker |
| 6,865,965 | B2 | 3/2005 | Uchino |
| 7,244,209 | B2 | 7/2007 | Nozaki et al. |
| 7,611,434 | B2 * | 11/2009 | Fukushima ............. F16H 61/12 |
| | | | 475/119 |
| 7,713,165 | B2 | 5/2010 | Kim |
| 7,771,317 | B2 | 8/2010 | Gierer et al. |

(Continued)

FOREIGN PATENT DOCUMENTS

| DE | 102010036545 A1 | 1/2012 |
| JP | 2004225800 A | 8/2004 |

(Continued)

*Primary Examiner* — David J Hlavka
(74) *Attorney, Agent, or Firm* — von Briesen & Roper, s.c.

(57) ABSTRACT

A transmission for a machine is disclosed. The transmission may comprise a first torque path for transmission of torque from an input shaft to an output shaft, and a single clutch element along the first torque path. The transmission may further comprise a clutch actuator configured to actuate engagement of the clutch element, and a clutch pressure control (CPC) valve configured to permit a flow of hydraulic fluid to the clutch actuator when in an open position to cause the clutch actuator to actuate engagement of the clutch element. The transmission may further comprise a FMR valve having a failure position obstructing flow of the hydraulic fluid from the CPC valve to the clutch actuator when the CPC valve is in the open position. The FMR valve actuated by pilot pressure from a CPC valve that controls actuation of other clutch elements that are not on the first torque path.

20 Claims, 11 Drawing Sheets

(56) References Cited

U.S. PATENT DOCUMENTS

| | | | |
|---|---|---|---|
| 7,780,572 B2 * | 8/2010 | Gierer | F16D 48/02 |
| | | | 477/175 |
| 8,192,318 B2 | 6/2012 | Collins et al. | |
| 8,285,463 B2 | 10/2012 | Moses et al. | |
| 2007/0123388 A1 * | 5/2007 | Petrzik | F16H 61/688 |
| | | | 477/174 |

FOREIGN PATENT DOCUMENTS

| | | |
|---|---|---|
| JP | 2010078090 A | 4/2010 |
| JP | 4680615 B2 | 2/2011 |
| JP | 2018100746 A | 6/2018 |

* cited by examiner

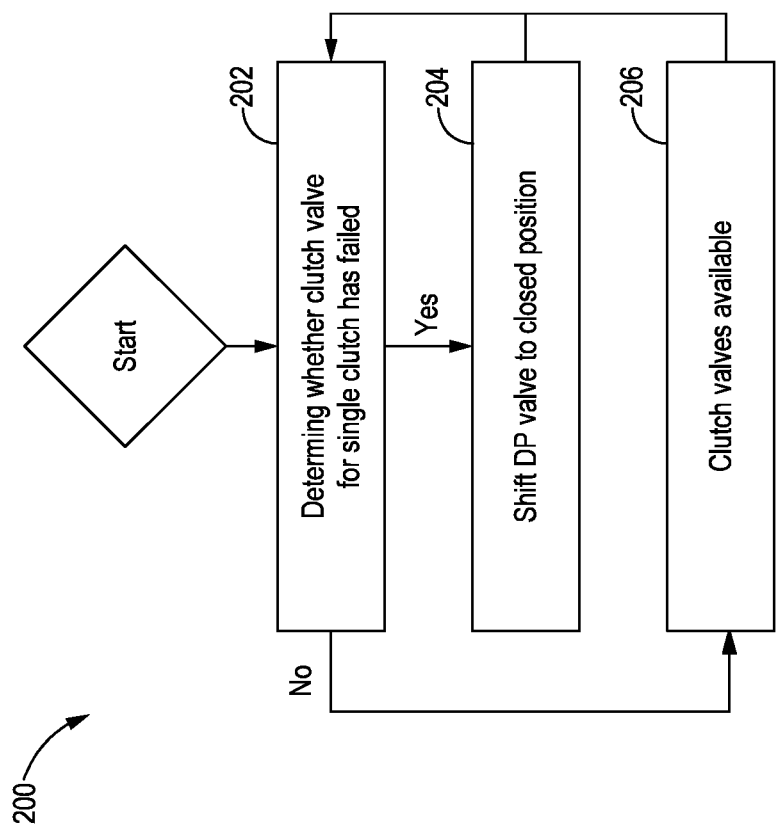

CLUTCH HYDRAULIC CONTROL CIRCUIT WITH A PILOT OPERATED FAILURE MODE RESPONSE VALVE

TECHNICAL FIELD

The present disclosure generally relates to transmissions for machines and, more specifically, to hydraulic control systems for clutch elements in transmissions.

BACKGROUND

Vehicles such as work machines may include a powertrain to transmit power from a power source (e.g., an internal combustion engine) to driven elements such as wheels, tracks, or other propulsion devices for vehicle travel. The powertrain may include a transmission that allows power transmission from an input shaft rotationally coupled to the power source to an output shaft rotationally coupled to the driven elements. The transmission may reduce the higher engine speed to a lower output speed to the driven elements, increasing torque in the process. A transmission may include a number of torque paths that each transmit torque from the input shaft to the output shaft at a different gear ratio. For example, a conventional transmission design may have five torque paths at different gear ratios, including three forward gears and two reverse gears. Shifting between the gears may be achieved automatically in automatic transmissions, or manually by the operator in manual transmissions. In conventional transmission designs, each torque path may include at least two hydraulically-actuated clutch elements (for example, clutches, synchronizers, sliding dog collars, or the like.) that are engaged simultaneously to complete the torque path and permit torque transmission from the input shaft to the output shaft. Actuation of clutch element engagement may be controlled hydraulically by hydraulic fluid pressure supplied from a hydraulic fluid source through an actuation valve. An electronic control module (ECM) may command opening and closing of the actuation valve associated with each clutch element.

The engagement of at least two hydraulically-actuated clutch elements to complete each torque path allows one of the hydraulically-actuated clutch elements to disengage and interrupt torque transmission along the torque path if there is a fault or failure in the actuation valve of the other clutch element. Failure of the actuation valve may occur, for example, due to valve contamination that prevents the valve spool from moving freely, or due to electrical faults. A fault or failure in the actuation valve may result in hydraulic fluid delivery to the clutch element for engagement without a command from the ECM. Without a second clutch element that disengages to interrupt the torque path, the transmission may be stuck in an undesired gear and uncommanded motion of the machine may result. While effective for at least the aforementioned reasons, the use of at least two hydraulically-actuated clutch elements in each torque path may be more expensive and space consuming than a single clutch element design.

In addition, current methods for detecting a fault or failure in the actuation valve may rely on speed or torque sensors whose responses may be time delayed. The delay may be exaggerated under certain operating conditions such as, but not limited to, cold ambient conditions as may be experienced during machine start-up. The delay may impede the machine's designed failure response, and possibly create delays from the operator's perspective.

U.S. Pat. No. 6,865,965 discloses an automated manual transmission that has an input shaft having a plurality of driving gears, and an output shaft having a plurality of driven gears engaging with the driving gears, and further has two bypass clutches for coupling the input shaft and the output shaft with each other and releasing them from coupling. Electromagnetic valves are provided in hydraulic oil paths for guiding hydraulic pressure from a hydraulic pressure supply portion to the bypass clutches respectively. A bypass oil path for bypassing the hydraulic oil paths is provided with a bypass oil path on-off valve for opening the bypass oil path when the electromagnetic valves cannot be operated due to a failure of an electric system. A bypass oil path change-over valve is provided for changing over to supply hydraulic pressure from the bypass oil path on-off valve to one of the bypass clutches. While beneficial, a better system or alternative strategy is needed to cost effectively handle control of a clutch element on a torque path.

SUMMARY

In accordance with one aspect of the present disclosure, a transmission for a machine is disclosed. The transmission may comprise an input shaft rotationally coupled to a power source, an output shaft and a first torque path configured to provide a first path for transmission of torque at a first torque path gear ratio from the input shaft to the output shaft. The transmission further comprises a first clutch element disposed on the first torque path, a first clutch actuator configured to actuate shifting of the first clutch element between the engaged position and the disengaged position, and a first clutch valve having an open position and a closed position. The first clutch element is moveable between an engaged position and a disengaged position and is configured to permit the transmission of torque from the input shaft to the output shaft when in the engaged position. The first clutch element further configured to block the transmission of torque from the input shaft to the output shaft when in the disengaged position. The first clutch element is the only clutch element disposed on the first torque path. The first clutch valve is configured to permit when in the open position a flow of hydraulic fluid to the first clutch actuator through a first control pressure line to cause the first clutch actuator to shift the first clutch element to the engaged position. The transmission further comprises a failure mode response (FMR) valve in the first control pressure line between the first clutch valve and the first clutch actuator. The FMR valve having a normal position that permits hydraulic fluid received from the first clutch valve to flow to the first clutch actuator when the first clutch valve is in the open position, and a failure position that simultaneously obstructs the flow of the hydraulic fluid received from the first clutch valve to the first clutch actuator when the first clutch valve is in the open position, and permits the flow of hydraulic fluid from the first clutch actuator to the hydraulic fluid sump, wherein the transmission of torque along the first torque path is interrupted when the FMR valve is in the failure position. The transmission further comprises a second torque path, a second clutch element moveable between an engaged position and a disengaged position, a second clutch actuator configured to actuate shifting of the second clutch element between the engaged position and the disengaged position and a dual-purpose valve having an open position and a closed position. The second torque path configured to provide a second path for transmission of torque at a second torque path gear ratio from the input shaft to the output shaft, wherein a portion of the second torque path is different than the first torque path. The second clutch element moveable between an engaged position and a disengaged position, the second clutch element disposed on the portion of the second torque path that is different than the first torque path, the second clutch element configured to permit the transmission of torque from the input shaft along the second torque path when in the engaged position, the second clutch element further configured to block the transmission of torque from the input shaft on the second torque path when the second clutch element is in the disengaged position. The dual-purpose valve configured to: (a) permit, when in the open position, hydraulic fluid to flow: (i) to the second clutch actuator through a second control pressure line to cause the second clutch actuator to shift the second clutch element to the engaged position and (ii) to the FMR valve through a pilot line to shift the FMR valve to the normal position and; (b) to obstruct, when in the closed position, the flow of hydraulic fluid: (i) to the second clutch actuator through the second control pressure line to cause the second clutch actuator to shift the second clutch element to the disengaged position and (ii) to the FMR valve through the pilot line to shift the FMR valve to the failure position, wherein transmission of torque from the input shaft to the output shaft is blocked along the first torque path when dual-purpose valve is in the closed position and transmission of torque from the input shaft through the second clutch element is blocked when the dual-purpose valve is in the closed position.

In accordance with another aspect of the present disclosure, a method for hydraulically controlling a first clutch element along a first torque path of a transmission of a machine is disclosed. The transmission may include: the first clutch element disposed on the first torque path from an input shaft to an output shaft; a second clutch element disposed on a second torque path from the input shaft to the output shaft, wherein the second clutch element is disposed on a portion of the second torque path that is different than the first torque path, a failure mode response (FMR) valve disposed between a first clutch valve and the first clutch actuator, the FMR valve having a normal position that permits hydraulic fluid received from the first clutch valve to flow to the first clutch actuator to engage the first clutch element when the first clutch valve is in the open position, and a failure position that simultaneously obstructs the flow of the hydraulic fluid received from the first clutch valve to the first clutch actuator when the first clutch valve is in the open position, and permits the flow of hydraulic fluid from the first clutch actuator to a hydraulic fluid sump, wherein the transmission of torque along the first torque path is interrupted when the FMR valve is in the failure position, and a dual-purpose (DP) valve configured to: (a) permit, when in the open position, hydraulic fluid to flow: (i) to shift the second clutch element to an engaged position that permits transmission of torque along the second torque path at a second torque path gear ratio and (ii) to shift the FMR valve to the normal position and (b) to obstruct, when in the closed position, the flow of hydraulic fluid: (i) to shift the second clutch element to the disengaged position that blocks transmission of torque along the second torque path and (ii) to shift the FMR valve to the failure position to disengage the first clutch element and block the transmission of torque on the first torque path. The method may comprise: upon detecting a failed condition of the first clutch valve, activating, by a controller, shifting of the DP valve to the closed position to shift to or maintain the FMR valve in a failure position that disengages the first clutch element, the transmission of torque along the first torque path interrupted when the FMR valve is in the failure position, wherein the failed condition is when the first clutch valve is in the open position without a command from the controller.

In accordance with another aspect of the present disclosure, a hydraulic control system for controlling a clutch element of a transmission of a machine is disclosed. The transmission may include an output shaft, a first torque path configured to provide a first torque path for transmission of torque at a third gear ratio from the input shaft to the output shaft, a first clutch element disposed on the first torque path and moveable between an engaged position and a disengaged position, the first clutch element configured to permit transmission of torque from the input shaft to the output shaft when in the engaged position and to block transmission of torque from the input shaft to the output shaft when in the disengaged position, wherein the first clutch element is the only clutch element disposed on the first torque path, a second torque path configured to provide a second torque path for transmission of torque at a second gear ratio from the input shaft to the output shaft, wherein a portion of the second torque path is different than the first torque path, and a second clutch element moveable between an engaged position and a disengaged position, the second clutch element disposed on the portion of the second torque path that is different than the first torque path, the second clutch element configured to permit the transmission of torque from the input shaft along the second torque path when in the engaged position and to block the transmission of torque from the input shaft on the second torque path when the second clutch element is in the disengaged position. The hydraulic control system may comprise: a first clutch actuator configured to actuate shifting of the first clutch element between the engaged position and the disengaged position; a first clutch pressure control (CPC) valve having an open position and a closed position; a failure mode response (FMR) valve; a second clutch actuator configured to actuate shifting of the second clutch element between the engaged position and the disengaged position; and a dual-purpose (DP) valve having an open position and a closed position; and a controller. The first CPC valve may be configured to permit when in the open position a flow of hydraulic fluid to the first clutch actuator through a first control pressure line to cause the first clutch actuator to shift the first clutch element to the engaged position. The FMR valve is disposed in the first control pressure line between the first CPC valve and the first clutch actuator. The FMR valve has a normal position that permits hydraulic fluid received from the first CPC valve to flow to the first clutch actuator when the first CPC valve is in the open position, and a failure position that simultaneously obstructs the flow of the hydraulic fluid received from the first CPC valve to the first clutch actuator when the first CPC valve is in the open position, and permits the flow of hydraulic fluid from the first clutch actuator to a hydraulic fluid sump, wherein the transmission of torque along the first torque path is interrupted when the FMR valve is in the failure position. The dual-purpose valve may be configured to: (a) permit, when in the open position, hydraulic fluid to flow: (i) to the second clutch actuator through a second control pressure line to cause the second clutch actuator to shift the second clutch element to the engaged position and (ii) to the FMR valve through a pilot line to shift the FMR valve to the normal position and; (b) to obstruct, when in the closed position, the flow of hydraulic fluid: (i) to the second clutch actuator through the second control pressure line to cause the second clutch actuator to shift the second clutch element to the disengaged position and (ii) to the FMR valve through the pilot line to shift the FMR valve to the failure position, wherein transmission of torque from the input shaft to the output shaft is blocked along the first torque path when dual-purpose valve is in the closed position and transmission of torque from the input shaft through the second clutch element is blocked when the dual-purpose valve is in the closed position. The controller may be in communication with the first clutch valve and dual-purpose valve. The controller may be configured to: shift the first clutch valve to the open position to move the first clutch element to the engaged position, and shift the first clutch valve to the closed position to move the first clutch element to the disengaged position; and upon detecting a failed condition of the first clutch valve, shift the dual-purpose valve to the closed position, the first clutch valve being in the failed condition when the first clutch valve is in the open position without a command from the controller.

These and other aspects and features of the present disclosure will be more readily understood when read in conjunction with the accompanying drawings.

BRIEF DESCRIPTION OF THE DRAWINGS

FIG. 5 illustrates the clutch element associated with the DP valve under normal conditions with the DP valve in an open position that shifts the associated clutch element to an engaged position and provides pilot pressure to the failure mode response (FMR) valve, in accordance with the present disclosure.

FIG. 11 is a flowchart of an exemplary method for controlling the clutch element during the operation of the machine, in accordance with a method of the present disclosure.

DETAILED DESCRIPTION

Figure 1:
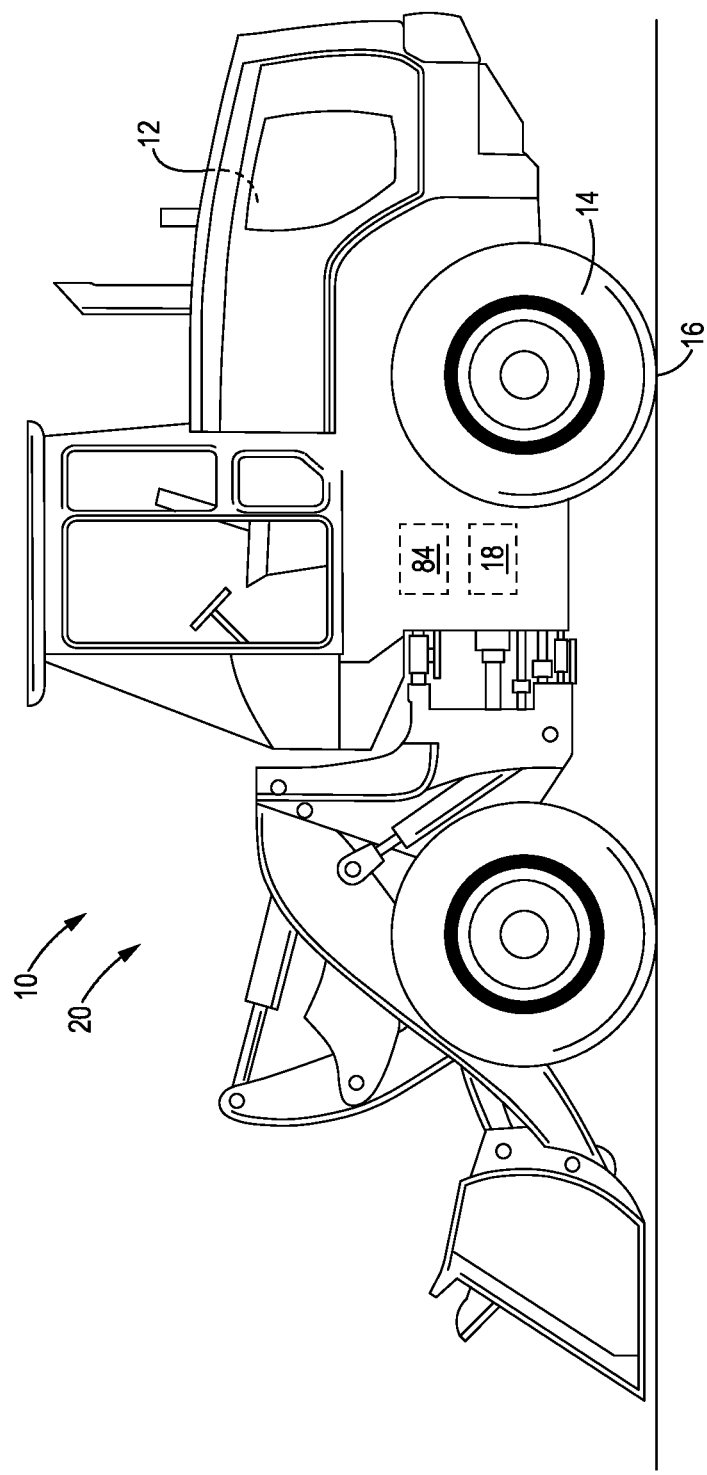
FIG. 1 is a side view of a machine, constructed in accordance with the present disclosure.

Referring now to the drawings, and with specific reference to FIG. 1, a machine 10 is shown. The machine 10 may include a power source 12, such as an internal combustion engine, that drives driven elements 14 such as wheels 16, tracks, or other propulsion devices for movement, as well a transmission 18 that transmits power from the power source 12 to the driven elements 14 at various gear ratios (also see FIG. 2). The transmission 18 may be an automatic transmission that allows automatic shifting between speeds and their associated gear ratios as is understood by those with ordinary skill in the art. Although depicted as a wheel loader 20, the machine 10 may be other types of machines having the aforementioned components such as, but not limited to, vehicles or work machines such as off-highway trucks, mining equipment, tractors, excavators, and dozers.

Figure 2:
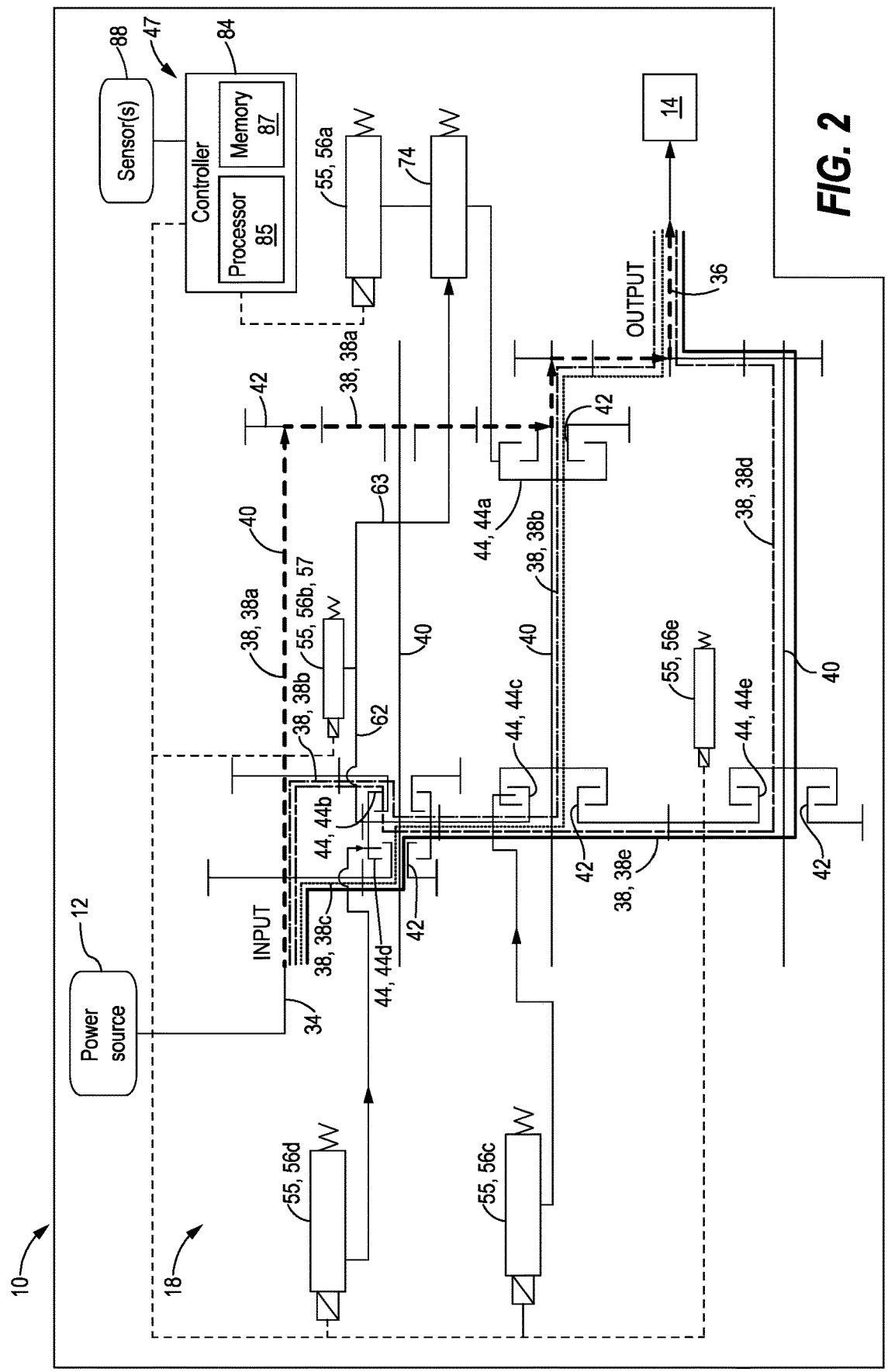
FIG. 2 is a schematic representation of an exemplary transmission of the machine including a plurality of torque paths, in accordance with the present disclosure.

FIG. 2 shows a transmission 18 in accordance with the present disclosure. As those with ordinary skill in the art will appreciate, the depicted transmission 18 is merely exemplary and may have various other configurations in practice. The transmission 18 may include an input shaft 34 rotationally coupled to the power source 12, an output shaft 36 rotationally coupled to the driven elements 14, one or more hydraulically-actuated clutch elements 44, and a plurality of torque paths 38 that each provide a path for transmission of torque at a gear ratio from the input shaft 34 to the output shaft 36. As will be understood by those with ordinary skill in the art, power may be transmitted along the torque path 38 via interconnecting shafts 40 and gears 42 that rotationally couple to transmit power to the output shaft 36 at the specific gear ratio. The one or more hydraulically-actuated clutch elements 44 disposed along each torque path 38 allow transmission of torque along the respective associated torque path 38 when engaged (in the engaged position 51) and block transmission of torque along the torque path 38 when disengaged (in the disengaged position 53). For example, when a clutch element is engaged, the gears 42 (associated with the clutch element 44) rotate together with the shaft 40. When the clutch element 44 is disengaged such gears 42 do not rotate with the shaft 40 and torque is not transmitted through the clutch element 44.

The clutch element 44 may be any type of clutch element 44 that is hydraulically-actuated such as, but not limited to, a multi-disc wet clutch. In some embodiments, one or more clutch element(s) 44 may be utilized as a speed clutch(es) or as a directional clutch(es). A speed clutch is one that is configured to control the speed ratio of the transmission 18. A directional clutch is one that is configured to control directional movement, e.g., forward or backward, of the machine 10.

For the purposes of explanation, the exemplary embodiment of the machine 10 discussed herein has three speeds when the machine 10 is moving in the forward direction, namely first, second and third speed, and has two speeds (first and second) when the machine 10 is moving in the reverse direction. Each speed is typically equivalent to a range of gear ratios. Other embodiments may have different combinations of speeds and/or directions available to the operator.

Given the above, five exemplary torque paths 38 are shown on FIG. 2. Torque path 38a is associated with movement of the machine 10 in third speed in the forward direction and provides a path for transmission of torque at a gear ratio (associated with third speed) from the input shaft 34 to the output shaft 36. On this torque path 38a, in this exemplary embodiment, there is a single (hydraulically-actuated) clutch element 44a, which is utilized as a speed clutch for third speed, disposed on the torque path 38a that allows the transmission of torque along the torque path 38a when engaged (in the engaged position 51), and blocks the transmission of torque along the torque path 38a when disengaged (in the disengaged position 53). The use of a single clutch element 44a on the torque path 38a, rather than two or more as is typical, may provide advantages such as reduced manufacturing costs and reduced packaging space.

Torque path 38b is associated with movement of the machine 10 in second speed in the forward direction and provides a path for transmission of torque at a gear ratio (associated with second speed) from the input shaft 34 to the output shaft 36. On this torque path 38b, in this exemplary embodiment, there is a combination of hydraulically-actuated clutch elements 44 disposed on the torque path 38b that allow the transmission of torque along the torque path 38b when engaged (in the engaged position 51) and block the transmission of torque along the torque path 38b when disengaged (in the disengaged position 53). Specifically, clutch element 44b, which is utilized as a speed clutch for second speed, and clutch element 44c, which is utilized as a directional clutch for the forward direction.

Torque path 38c is associated with movement of the machine 10 in first speed in the forward direction and provides a path for transmission of torque at a gear ratio (associated with first speed) from the input shaft 34 to the output shaft 36. On this torque path 38c, in this exemplary embodiment, there is a combination of hydraulically-actuated clutch elements 44 disposed on the torque path 38c that allows the transmission of torque along the torque path 38c when engaged (in the engaged position 51), and block the transmission of torque along the torque path 38c when disengaged (in the disengaged position 53). Specifically, clutch element 44d, which is utilized as a speed clutch for first speed, and clutch element 44c, which is utilized as a directional clutch for the forward direction.

Torque path 38d is associated with movement of the machine 10 in second speed in the reverse direction and provides a path for transmission of torque at a gear ratio (associated with second speed) from the input shaft 34 to the output shaft 36. On this torque path 38d, in this exemplary embodiment, there is a combination of hydraulically-actuated clutch elements 44 disposed on the torque path 38d that allows the transmission of torque along the torque path 38d when engaged (in the engaged position), and block the transmission of torque along the torque path 38d when disengaged (in the disengaged position 53). Specifically, clutch element 44b, which is utilized as a speed clutch for second speed, and clutch element 44e, which is utilized as a directional clutch for the reverse direction.

Torque path 38e is associated with movement of the machine in first speed in the reverse direction and provides a path for transmission of torque at a gear ratio (associated with first speed) from the input shaft 34 to the output shaft 36. On this torque path 38e, in this exemplary embodiment, there is a combination of hydraulically-actuated clutch elements 44 disposed on the torque path 38e that allows the transmission of torque along the torque path 38e when engaged (in the engaged position 51), and block the transmission of torque along the torque path 38e when disengaged (in the disengaged position 53). Specifically, clutch element 44d, which is utilized as a speed clutch for first speed, and clutch element 44e, which is utilized as a directional clutch for the reverse direction.

The transmission 18 further includes a control system 47 (see FIGS. 2-9) to allow and to interrupt torque transmission along the torque paths 38 of the transmission (see FIG. 2). The control system 47 (see FIGS. 2-9) includes a plurality of clutch actuators 48 (see FIGS. 3-9), a plurality of clutch valves 55 (FIGS. 2-9), a failure mode response (FMR) valve 74 (FIGS. 2 and 7-9), a dual-purpose (DP) valve 57 (FIGS. 2 and 5-6), a pump 68 configured to pump hydraulic fluid, and a controller 84. In the exemplary embodiment, the plurality of clutch valves 55 may include or be clutch pressure control (CPC) valves 56a, 56b, 56c, 56d, 56e.

Figure 3:
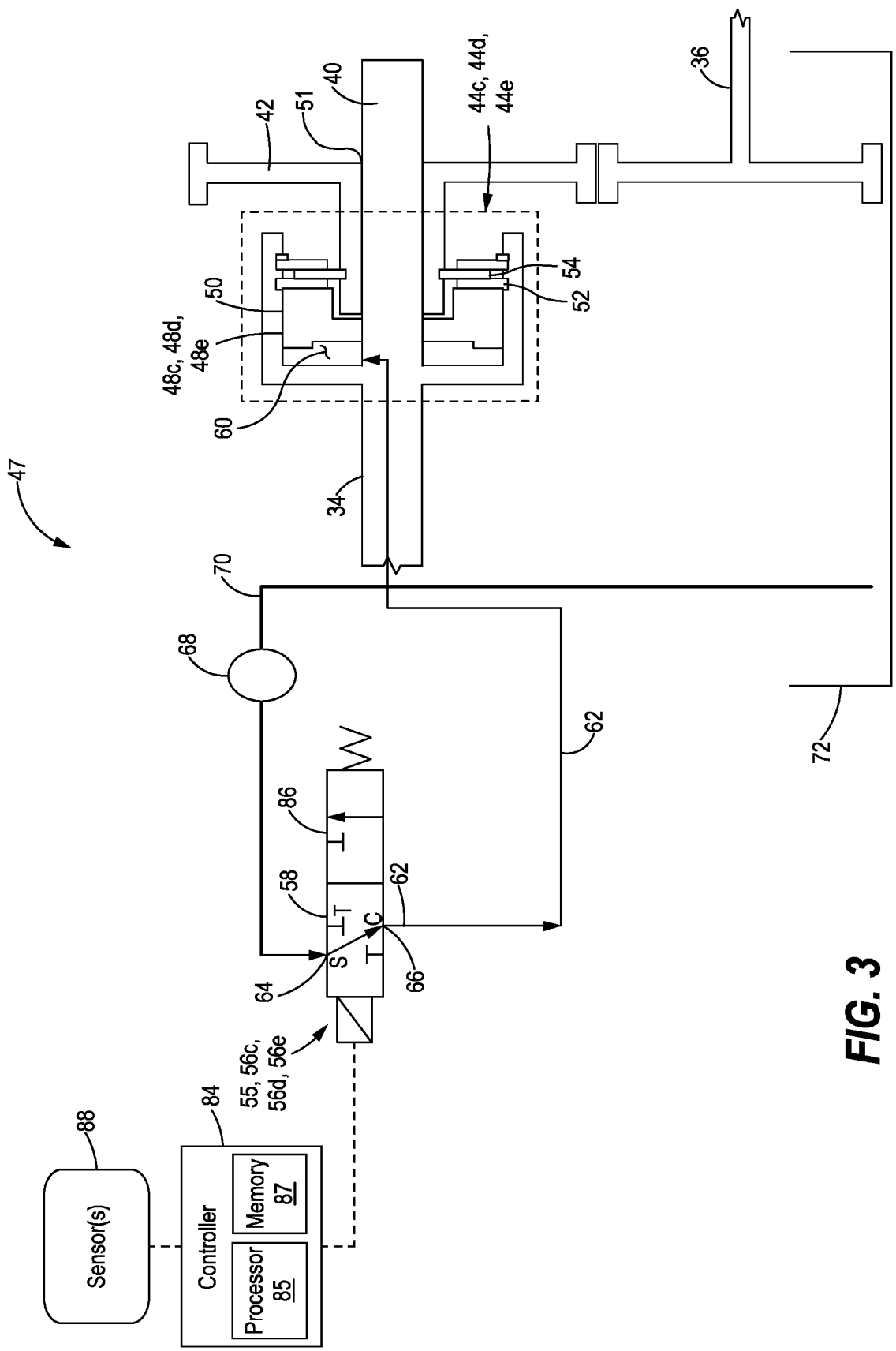
FIG. 3 is a schematic representation of an embodiment of a hydraulic control system for an exemplary clutch element under normal conditions illustrating the associated clutch pressure control (CPC) valve in an open position that shifts the respective clutch element to the engaged position, in accordance with the present disclosure.

Referring now to FIG. 3, a clutch element 44c, 44d, 44e under normal (non-failure) conditions during engagement of the clutch element 44c, 44d, 44e is shown. In the embodiment shown in FIG. 3, clutch actuators 48c, 48d, 48e and CPC valves 56c, 56d, 56e are associated with a clutch element 44c, 44d, 44e in a one-to-one relationship. In other words, in the exemplary embodiment, clutch actuator 48c and CPC valve 56c may be associated with clutch element 44c, clutch actuator 48d and CPC valve 56d may be associated with clutch element 44d, and clutch actuator 48e and CPC valve 56e may be associated with clutch element 44e. For conciseness, FIG. 3 only illustrates one CPC valve 56c, 56d, 56e, one clutch actuator 48c, 48d, 48e and one clutch element 44c, 44d, 44e however the functionality discussed with relation to FIG. 3 (and FIG. 4) is applicable to each of the following combinations: (1) clutch element 44c, CPC valve 56c and clutch actuator 48c; (2) clutch element 44d, CPC valve 56d and clutch actuator 48d; and (3) clutch element 44e, CPC valve 56e and clutch actuator 48e.

The clutch actuator 48c, 48d, 48e may include or may be a clutch piston 50, that uses hydraulic fluid pressure to actuate shifting of the associated clutch element 44c, 44d, 44e between engaged (the engaged position 51) and disengaged (the disengaged position 53). For example, if the clutch element 44c, 44d, 44e is a multi-disk wet clutch, the clutch actuator 48c, 48d, 48e may apply pressure to compress plates 52 and friction discs 54 of the clutch element 44c, 44d, 44e to shift the clutch element 44c, 44d, 44e to the engaged position 51 and allow rotational coupling between the input shaft 34 and the output shaft 36.

The CPC valves 56c, 56d, 56e are utilized as an actuation valve for the respective associated clutch element 44c, 44d, 44e. In an open position 58, the CPC valve 56c, 56d, 56e may permit flow of the hydraulic fluid to a clutch cavity 60 through a control pressure line 62, thereby compressing the clutch actuator 48c, 48d, 48e, and causing the clutch actuator 48c, 48d, 48e to engage (move to the engaged position 51) the (respective associated) clutch element 44c, 44d, 44e. Specifically, in the open position 58, a supply port 64 of the CPC valve 56c, 56d, 56e is connected to a control port 66, allowing the high pressure hydraulic fluid to flow into the control pressure line 62 to the associated clutch actuator 48c, 48d, 48e. The pump 68 may supply the high pressure hydraulic fluid to the CPC valve 56c, 56d, 56e via one or more supply lines 70 from a hydraulic fluid sump 72.

Figure 4:
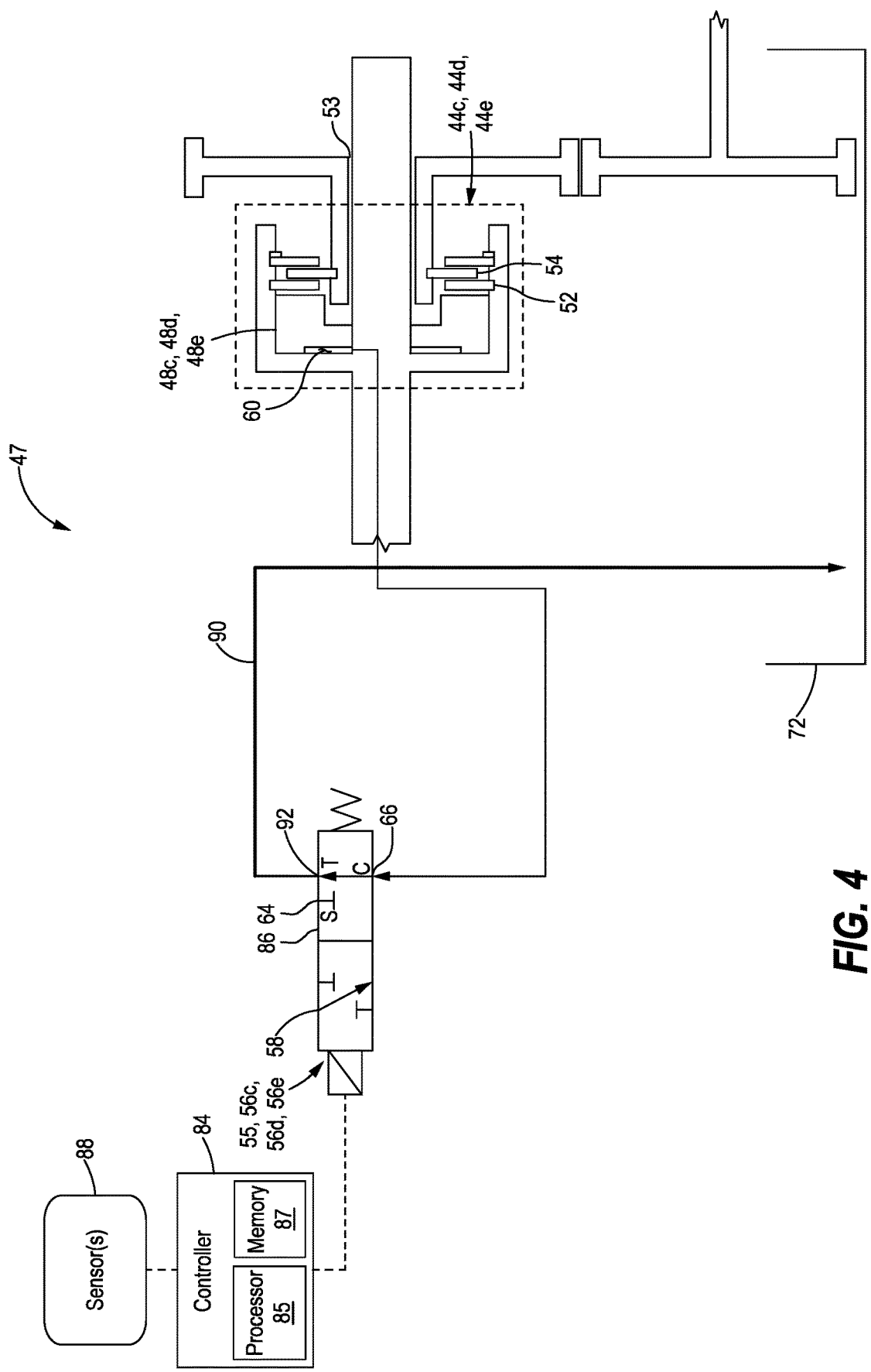
FIG. 4 is a schematic representation similar to FIG. 3 but with the CPC valve in a closed position that shifts the clutch element to the disengaged position, in accordance with the present disclosure.

Turning now to FIG. 4, a portion of the control system 47 for disengaging the clutch element 44c, 44d, 44e is shown. Under these conditions, the CPC valve 56c, 56d, 56e may be in the closed position 86, allowing the hydraulic fluid to drain from the clutch cavity 60 through one or more drain lines 90 into the hydraulic fluid sump 72 as the clutch actuator 48c, 48d, 48e releases pressure on the plates 52 and the friction discs 54. In the closed position 86, the supply port 64 of the CPC valve 56c, 56d, 56e may be closed, and the control port 66 may be connected to a tank port 92 for draining the hydraulic fluid to the sump 72. If the CPC valve 56c, 56d, 56e is a normally closed solenoid valve, the controller 84 may de-energize the CPC valve 56c, 56d, 56e to shift the CPC valve 56c, 56d, 56e from the open position 58 to the closed position 86.

Figure 5:
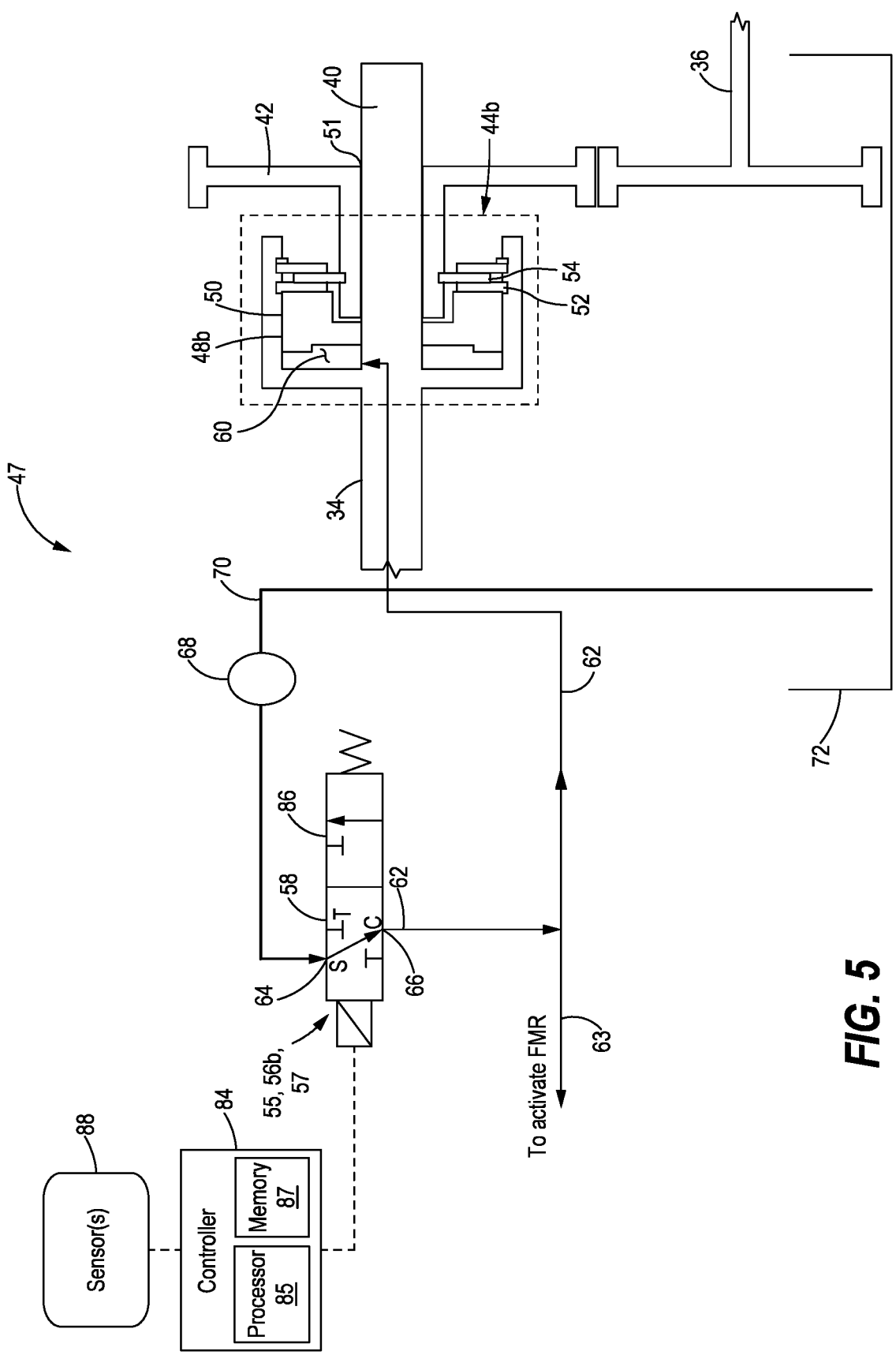
FIG. 5 is a schematic representation similar to FIG. 3 except that the CPC valve is a dual-purpose (DP) valve.

As shown in FIG. 2. the plurality of hydraulically-actuated clutch elements 44 of the transmission 18 further include clutch element 44b disposed on torque paths 38b and 38d. Turning now to FIG. 5, a portion of the control system 47 is shown that includes clutch actuator 48b and (another) clutch valve 55. In the embodiment of FIG. 5, the clutch valve 55 is a dual-purpose (DP) valve 57 that more specifically, in this embodiment, is a dual-purpose CPC valve 56b. Clutch actuator 48b and DP valve 57 are each associated with control of clutch element 44b, and DP valve 57 also provides/withholds pilot pressure to the FMR 74 valve (see FIGS. 7-9), as discussed later herein.

Referring again to FIG. 5, clutch element 44b is shown under normal (non-failure) conditions during engagement of the clutch element 44b. The clutch actuator 48b may include or may be a clutch piston 50, that uses hydraulic fluid pressure to actuate shifting of the associated clutch element 44b between the engaged position 51 (see FIG. 3) and the disengaged position 53 (see FIG. 4). For example, if the clutch element 44b is a multi-disk wet clutch, the clutch actuator 48b may apply pressure to compress plates 52 and friction discs 54 of the clutch element 44b to shift the clutch element 44b to the engaged position 51 and allow rotational coupling between the input shaft 34 and the output shaft 36.

The DP valve 57 is utilized as an actuation valve for the respective associated clutch element 44b. In an open position 58, the DP valve 57 may permit flow of the hydraulic fluid to a clutch cavity 60 through a control pressure line 62, thereby compressing the clutch actuator 48b, and causing the clutch actuator 48b to shift the associated clutch element 44b to the engaged position 51. Specifically, in the open position 58, a supply port 64 of the DP valve 57 is connected to a control port 66, allowing the high pressure hydraulic fluid to flow into the control pressure line 62 to the associated clutch actuator 48b and into the pilot line 63 to the FMR valve 74. The pump 68 may supply the high pressure hydraulic fluid to the DP valve 57 via one or more supply lines 70 from a hydraulic fluid sump 72.

Figure 6:
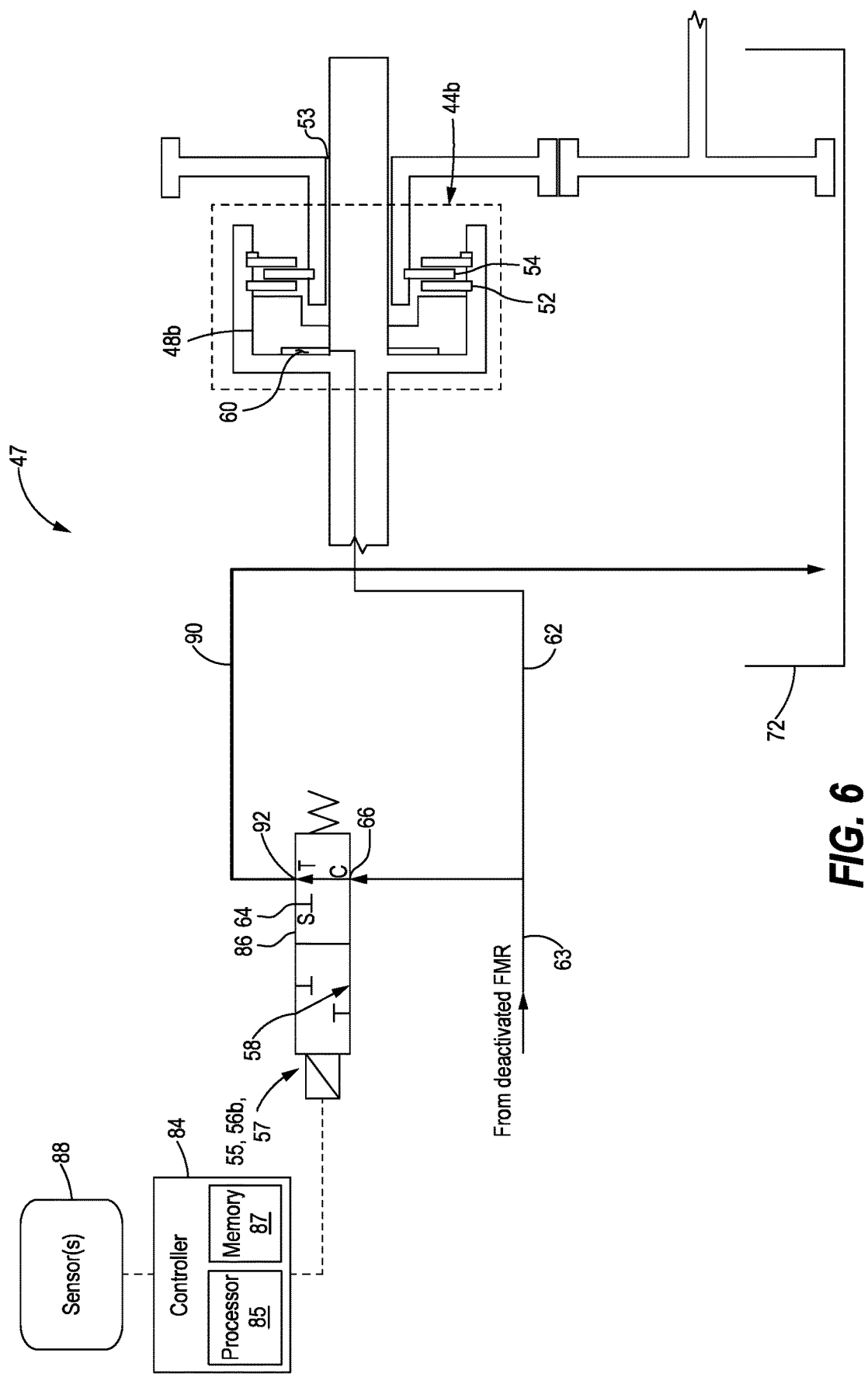
FIG. 6 is a schematic representation similar to FIG. 5 but with the DP valve in a closed position that shifts the associated clutch element to the disengaged position and relieves pilot pressure to the FMR valve, in accordance with the present disclosure.

Turning now to FIG. 6, the control system 47 when disengaging the clutch element 44b is shown. Under these conditions, the DP valve 57 may be in the closed position 86, allowing the hydraulic fluid to drain from the clutch cavity 60 through one or more drain lines 90 into the hydraulic fluid sump 72 as the clutch actuator 48b releases pressure on the plates 52 and the friction discs 54. In the closed position 86, the supply port 64 of the DP valve 57 may be closed, and the control port 66 may be connected to a tank port 92 for draining the hydraulic fluid from clutch cavity 60 and pilot line 63 from the FMR to the sump 72. If the DP valve 57/56b is a normally closed solenoid valve, the controller 84 may de-energize the DP valve 57 to shift the DP valve 57 from the open position 58 to the closed position 86. In the closed position 86, hydraulic fluid exits the pilot line 63.

Figure 7:
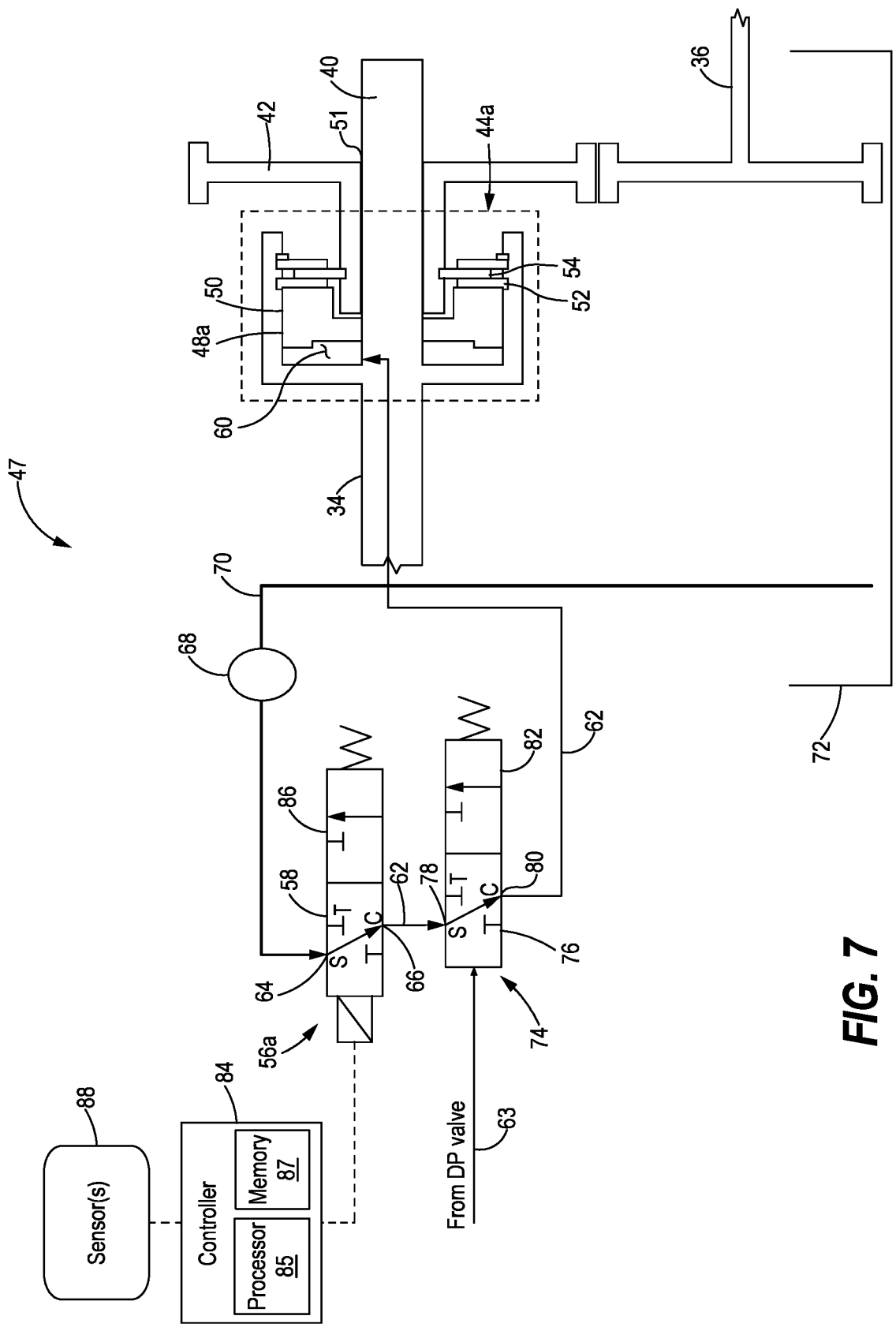
FIG. 7 is a schematic representation of the hydraulic control system utilized with torque path having a single clutch element under normal conditions with the associated CPC valve in an open position and the FMR valve in a normal position to engage the clutch element, in accordance with the present disclosure.

Referring to FIG. 7, the control system 47 includes a clutch actuator 48a (e.g., a clutch piston 50) that uses hydraulic fluid pressure to actuate shifting of clutch element 44a between the engaged position 51 (engaged) and the disengaged position 53 (disengaged). In FIG. 7, the hydraulic control system 47 for the single clutch element 44a is shown under normal (non-failure) conditions during engagement of the clutch element 44a. In the embodiment shown in FIG. 7, the clutch element 44a is a multi-disk wet clutch. The clutch actuator 48a may apply pressure to compress plates 52 and friction discs 54 of the clutch element 44a to shift the clutch element 44a to the engaged position 51 and allow rotational coupling between the input shaft 34 and the output shaft 36. The plurality of clutch valves 55 of the control system 47 further includes CPC valve 56a as the actuation valve for the clutch element 44a. In an open position 58, the CPC valve 56a may permit flow of the hydraulic fluid to a clutch cavity 60 through a control pressure line 62, thereby compressing the clutch actuator 48a, and causing the clutch actuator 48a to engage the clutch element 44a. Specifically, in the open position 58, a supply port 64 of the CPC valve 56a is connected to a control port 66, allowing the high pressure hydraulic fluid to flow into the control pressure line 62 to the clutch actuator 48a. The pump 68 may supply the high pressure hydraulic fluid to the CPC valve 56a via one or more supply lines 70 from a hydraulic fluid sump 72.

The control system 47 further includes a failure mode response (FMR) valve 74 in the control pressure line 62 between the CPC valve 56a and the clutch actuator 48a. The FMR valve 74 may have a normal position 76 that allows the flow of the hydraulic fluid from the CPC valve 56a to the clutch actuator 48a when the CPC valve 56a is in the open position 58. Specifically, in the normal position 76 of the FMR valve 74, a supply port 78 is connected to a control port 80 to allow the high pressure hydraulic fluid to flow from the CPC valve 56a to the clutch actuator 48a. If the FMR valve 74 is a closed valve when not actuated, the controller 84 may energize the DP valve 57 to shift DP valve 57 from the closed position 86 to the open position 58 to allow fluid to flow through the DP valve 57 and to the FMR valve 74 through pilot line 63. Fluid flowing through the DP valve 57 will also result in engagement of clutch 44b, but so long as CPC valve 56c is not activated by the controller 84, transmission of torque is blocked on torque path 38b. Similarly, so long as CPC 56e is not activated by the controller 84, transmission of torque is blocked on torque path 38e. This (pilot) fluid received by the FMR valve 74 from the DP valve 57 provides pilot pressure that actuates the FMR valve 74 to shift the FMR valve 74 into the normal position 76 (see FIGS. 7-8). As explained in further detail below, the FMR valve 74 also includes a failure position 82 (see FIG. 9) that obstructs the flow of the high pressure hydraulic fluid from the CPC valve 56a to the clutch actuator 48a while simultaneously allowing flow from the clutch actuator 48a to the hydraulic fluid sump 72 when the CPC valve 56a is in the open position 58 and in the failed condition. The CPC valve 56a and the FMR valve 74 may be normally closed valves, as shown in FIG. 7. However, in other arrangements, the CPC valve 56a and the FMR valve 74 may be any combination of normally open or normally closed valves.

Figure 8:
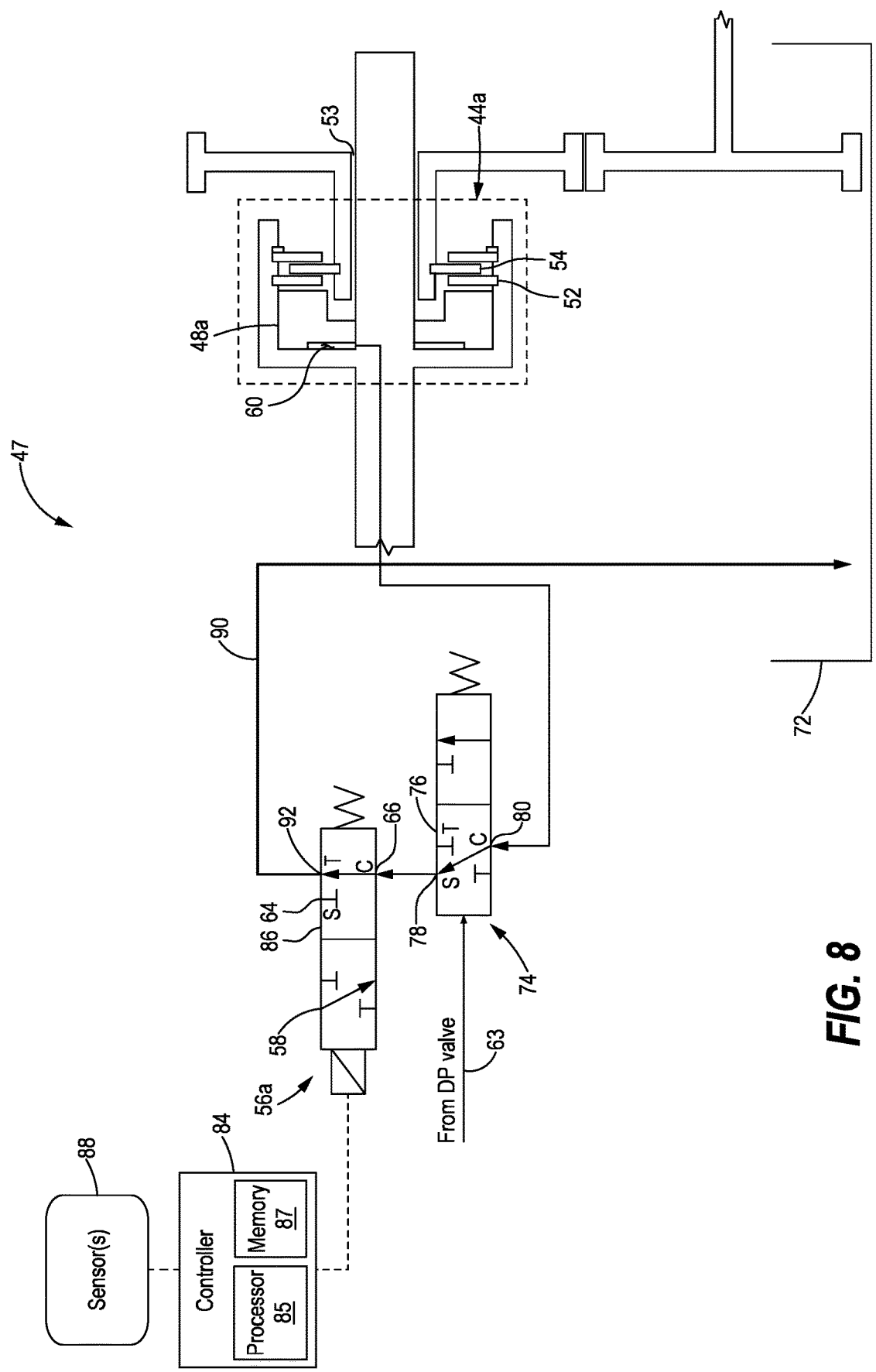
FIG. 8 is a schematic representation similar to FIG. 7 but with the CPC valve in a closed position and the FMR in a normal position to disengage the clutch element, in accordance with the present disclosure.

Turning now to FIG. 8, the control system 47 under normal (non-failure) conditions when disengaging the clutch element 44a is shown. Under these conditions, the CPC valve 56a may be in the closed position 86, allowing the hydraulic fluid to drain from the clutch cavity 60 through one or more drain lines 90 into the hydraulic fluid sump 72 as the clutch actuator 48a releases pressure on the plates 52 and the friction discs 54. In the closed position 86, the supply port 64 of the CPC valve 56a may be closed, and the control port 66 may be connected to a tank port 92 for draining the hydraulic fluid to the sump 72. If the CPC valve 56a is a normally closed solenoid valve, the controller 84 may de-energize the valve 56a to shift the valve 56a from the open position 58 to the closed position 86. Furthermore, the FMR valve 74 may remain in the normal position 76 allowing the hydraulic fluid to drain from the clutch cavity 60 to the CPC valve 56 via the connected control port 80 and supply port 78.

Figure 9:
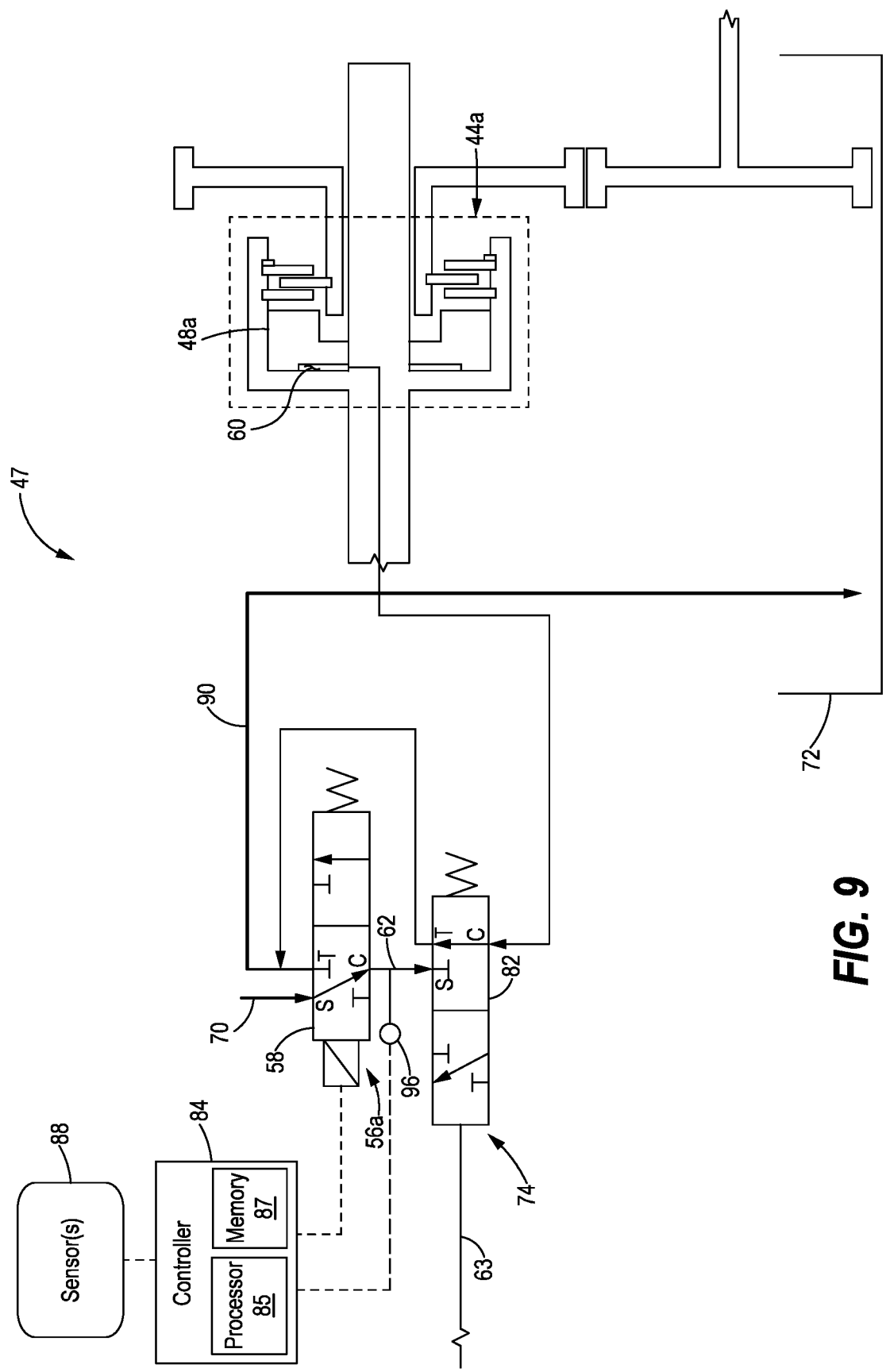
FIG. 9 is a schematic representation similar to FIG. 7 but under a failed condition of the CPC valve with the FMR valve in a failure position to interrupt the transmission of torque along the torque path, constructed in accordance with the present disclosure.

FIG. 9 shows the control system 47 under a failed condition when the CPC valve 56a is in the open position 58 for engaging the clutch element 44a without a command from the controller 84. That is, in the failed condition, the CPC valve 56a may be in the open position 58 to allow hydraulic fluid to flow to the clutch cavity 60 even though commanded to a zero pressure by the controller 84. Under these conditions, the FMR valve 74 may shift to the failure position 82 to obstruct the flow of the hydraulic fluid from the CPC valve 56a to the clutch cavity 60 and the clutch actuator 48a, and thereby prevent or cease uncommanded engagement of the clutch element 44a. That is, when the FMR valve 74 is in the failure position 82, the transmission of torque along the torque path 38a may be interrupted to prevent uncommanded machine movement. While in the failure position 82, the FMR valve 74 may simultaneously permit the hydraulic fluid to drain from the clutch cavity 60 to the hydraulic fluid sump 72 through the drain line 90, thereby bypassing the CPC valve 56a and allowing the disengagement of the clutch element 44a. Specifically, the supply port 78 of the FMR valve 74 may be closed, and the control port 80 may be connected to a tank port in fluid communication with the drain line 90, allowing the hydraulic fluid to drain from the clutch cavity 60 into the hydraulic fluid sump 72. As explained above, if the FMR valve 74 is a closed valve when not activated by pilot fluid pressure from the DP valve 57, the controller 84 may de-energize the DP valve 57 to shift DP valve 57 from the open position 58 to the closed position 86 to block fluid from flowing through the DP valve 57 to the FMR valve 74. Lack of fluid that provides pilot pressure to the FMR valve 74, will result in the FMR valve 74 shifting to a failure position 82. When the DP valve 57 is in the closed position 86, torque paths 38a (associated with third speed), 38b (associated with second speed and forward direction) and 38d (associated with second speed and reverse direction) are not available, which in the exemplary embodiment means that only torque path 38c associated with first speed in the forward direction and torque path 38e associated with first speed in the reverse direction are available for the machine 10. This allows an operator to move a machine 10 at a relatively low speed (first speed) to a location where it can be serviced while halting or preventing uncommanded motion in the machine 10 on the torque path 38a that has only the single clutch element 44a.

According to signals received from the sensor(s) 88, the controller 84 may detect the failed condition of the CPC valve 56a and de-energize the DP valve 57 to shift to or remain in the closed position 86 (if the DP valve 57 is a normally closed solenoid valve.) In one configuration, the sensor(s) 88 may be one or more speed or torque sensors associated with one or more shafts 40 along the torque path 38a and/or the input and output shafts 34 and 36. With knowledge of the commanded gear and the sensed transmission speed or torque received from the sensor(s) 88, the controller 84 may determine if the CPC valve 56a is in the failed condition.

Alternatively, as shown in FIG. 9, the control system 46 may include one or more pressure sensors 96 to allow detection of the failed condition of the CPC valve 56a. The pressure sensor 96 may be associated with the control pressure line 62 between the CPC valve 56a and the FMR valve 74, and may detect hydraulic fluid pressure in the control pressure line 62. When the CPC valve 56a is in the failed condition (i.e., in the open position 58 without a command from the controller 84), hydraulic fluid pressure may exist in the control pressure line due to uncommanded hydraulic fluid flow from the CPC valve 56a. The controller 84 may be in communication with the pressure sensor 96 and may receive signals from the pressure sensor 96 indicating that hydraulic fluid pressure exists in the control pressure line 62. If the CPC valve 56a is not commanded to be in the open position 58, the controller 84 may determine that the CPC valve 56a is in the failed condition upon receipt of such signals from the pressure sensor 96. If the controller 84 determines that the CPC valve 56a is in the failed condition, the controller 84 may shift the DP valve 57 to the closed position 86 to cause the FMR valve 74 to shift to the failure position 82 to obstruct uncommanded hydraulic fluid flow to the clutch actuator 48a and prevent or cease uncommanded engagement of the clutch element 44a. In the failure position 82, the hydraulic fluid from the clutch cavity 60 may drain through the FMR valve 74 to the hydraulic fluid sump 72 allowing the clutch element 44a to disengage. Compared to the speed or torque sensors described above which may have a delay in response time, the pressure sensor 96 may provide direct or real-time monitoring of a failed condition of the CPC valve 56a. The controller 84 may continually monitor the output signal from the pressure sensor 96, and trigger shifting of the FMR valve 74 to the failure position 82 (by shifting the DP valve 57 to the closed position 86) at any point when hydraulic fluid pressure is detected in in the control pressure line 62 and the CPC valve 56a is commanded to zero pressure.

The controller 84 may include a processor 85 and a memory component 87. The controller 84 is in operable communication with the plurality of clutch valves 55 (e.g., CPC valves 56a, 56c, 56d, 56e) and the DP valve 57/56b. The controller 84 may also be in operable communication with a user input device or machine controller from which the controller receives requested speed and direction data. For example, in the exemplary embodiment, the requested speed may be a first speed, a second speed or a third speed and the direction may be forward or reverse. The controller 84 is configured to shift the CPC valve(s) 56, or the DP valve 57 and CPC valve 56 between the open position 58 and a closed position 86 as needed to engage or disengage the associated clutch element 44 in response to the received requested gear and direction data.

The controller 84 is also configured to shift the DP valve 57 to block/provide pilot pressure hydraulic fluid to the FMR valve 74 in order to shift the FMR valve 74 between the normal position 76 and the failure position 82 according to the condition of the CPC valve 56a.

As noted earlier, in the exemplary embodiment, the CPC valves 56, the DP valve 57 and the FMR valve 74 are closed valves when not actuated. Thus, in the exemplary embodiment, the controller 84 is configured to energize the respective CPC valve 56 to shift the CPC valve 56 to the open position 58. Further the controller 84 is configured to energize the DP valve 57 to actuate the FMR valve 74 to the normal position 76. The controller 84 is configured to de-energize the respective CPC valve 56 to position the CPC valve 56 in the closed position 86. The controller is further configured to energize the DP valve 57 to maintain the FMR valve 74 in the normal position 76 to disengage clutch element 44a.

As explained further below, the controller 84 is further configured to de-energize the DP valve 57 to shift the FMR valve 74 to the failure position 82 when a failed condition of the CPC valve 56a is detected. In order to determine whether the CPC valve 56a is in the failed condition, the controller 84 may be in communication with and receive signals from one or more sensors 88 configured to detect the failed condition of the CPC valve 56a.

The tables below illustrate an exemplary embodiment, for each of (1F) first speed in the forward direction on torque path 38c, (2F) second speed in the forward direction on torque path 38b, (3) third speed on torque path 38a, (1R) first speed in the reverse direction on torque path 38e, and (2R)

second speed in the reverse direction on torque path 38d, of the energization/de-energization of the associated clutch valves 55 (e.g., CPC valves 56a, 56c, 56d, 56e) and the DP valve 57/56b and the associated engagement/disengagement of the clutch elements 44. In particular, Table 1 illustrates the exemplary embodiment of clutch elements 44 and associated clutch valve(s) 56 and DP Valve 57 for the various torque paths 38 where a failed condition has not been detected for clutch valve 56a. In the embodiment, when the DP valve 57 is not energized, pilot pressure is not provided to the FMR valve 74 and fluid flowing to the clutch element 44a is blocked by the FMR valve 74 because the FMR valve 74 is in the failure position 82. When the DP Valve 57 is energized, pilot pressure is provided to the FMR valve 74 and the FMR valve 74 does not block fluid flow. In this scenario, transmission of torque along torque path 38a is blocked when the de-energized CPC valve 56a is in the de-energized state. Table 2 illustrates that when the controller 84 determines that CPC valve 56a has failed on (in the open position 58), the DP valve 57 is de-energized and only torque path 38c (1F) and torque path 38e (1R) are available.

TABLE 1

| | | Normal Mode Clutch/Valve States | | | | | Pilot | | |
| --- | --- | --- | --- | --- | --- | --- | --- | --- | --- |
| | | First | Second | Third Clutch | Fwd | Rev | Pressure Provided | Third Clutch | |
| | | 44d | 44b | 44a | 44c | 44e | to FMR (74) Valve | (44a) Fluid | Allowed |
| | | 56d (CPC) | 57 (DP) | 56a (CPC) | 56c (CPC) | 56e (CPC) | Valve, Y/N? | Path, O/B? | Gear, Y/N? |
| Gear (Torque Path) | 1F (38c) | On | | | On | | N | B | Y |
| | 2F (38b) | | On | | On | | Y | O | Y |
| | 3F (38a) | | On | On | | | Y | O | Y |
| | 1R (38e) | On | | | | On | N | B | Y |
| | 2R (38d) | | On | | | On | Y | O | Y |

On = Engaged/Energized
blank = Disengaged/De-energized
Off = Explicitly Disengaged/De-energized (Failure Response Mode)
O = Open Fluid Path
B = Blocked Fluid Path
CPC = Clutch Pressure Control (Valve)
DP = Dual Purpose (Valve)
FMR = Failure Mode Response (Valve)

TABLE 2

| | | Failure Response Mode Clutch/Valve States | | | | | Pilot | | |
| --- | --- | --- | --- | --- | --- | --- | --- | --- | --- |
| | | First | Second | Third Clutch | Fwd | Rev | Pressure Provided | Third Clutch | |
| | | 44d | 44b | 44a | 44c | 44e | to FMR (74) Valve | (44a) Fluid | Allowed |
| | | 56d (CPC) | 57 (DP) | 56a (CPC) | 56c (CPC) | 56e (CPC) | Valve, Y/N? | Path, O/B? | Gear, Y/N? |
| Gear (Torque Path) | 1F (38c) | On | Off | Failed On | On | | N | B | Y |
| | 2F (38b) | | Off | Failed On | | | N | B | N |
| | 3F (38a) | | Off | Failed On | | | N | B | N |
| | 1R (38e) | On | Off | Failed On | | On | N | B | Y |
| | 2R (38d) | | Off | Failed On | | | N | B | N |

On = Engaged/Energized
blank = Disengaged/De-energized
Off = Explicitly Disengaged/De-energized (Failure Response Mode)
O = Open Fluid Path
B = Blocked Fluid Path
CPC = Clutch Pressure Control (Valve)
DP = Dual Purpose (Valve)
FMR = Failure Mode Response (Valve)

The processor 85 may be a microcontroller, a digital signal processor (DSP), an electronic control module (ECM), a microprocessor or any other suitable processor 85 as known in the art. The processor 85 may execute instructions and generate control signals for energizing or de-energizing clutch valves 55 (56*a*,56*c*,56*d*,56*e*) and DP valve 57,56*b*. Such instructions may be read into or incorporated into a computer readable medium, such as the memory component 87 or provided external to the processor 85. In alternative embodiments, hard wired circuitry may be used in place of, or in combination with, software instructions to implement a control method.

The term "computer readable medium" as used herein refers to any non-transitory medium or combination of media that participates in providing instructions to the processor 85 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other computer readable medium.

The controller 84 is not limited to one processor 85 and memory component 87. The controller 84 may include several processors 85 and memory components 87. In an embodiment, the processors 85 may be parallel processors that have access to a shared memory component(s) 87. In another embodiment, the processors 85 may be part of a distributed computing system in which a processor 85 (and its associated memory component 87) may be located remotely from one or more other processor(s) 85 (and associated memory components 87) that are part of the distributed computing system.

The controller 84 may also be configured to retrieve from the memory component 87 data necessary for calculations related to the determinations of appropriate valve positions discussed herein.

During start-up of the machine 10, the FMR valve 74 may be in the failure position 82 by default to prevent uncommanded engagement of the clutch element 44*a* in case the CPC valve 56*a* is already in the failed condition. A rise in pressure in the control pressure line 62 detected by the pressure sensor 96 may be immediately detected by the controller 84 and, if the CPC valve 56*a* is commanded to zero pressure, the controller 84 may maintain the DP valve 57 in the closed position 86 and thus maintain the FMR valve 74 in the failure position 82. Additionally, the pressure sensor 96 may allow a direct and immediate signal of a failed condition of the CPC valve 56*a* during normal operation of the machine 10, permitting the controller 84 to immediately respond by triggering the shifting of the DP valve 57 to trigger shifting of the FMR valve 74 to the failure position 82. Thus, in either start-up or normal operating conditions, uncommanded engagement of the clutch element 44*a* and resulting uncommanded machine motion may be prevented when the CPC valve 56*a* fails.

Also disclosed herein is a system for controlling a clutch element 44*a* of a transmission 18 of the machine 10. The method may comprise, upon detecting a failed condition of the CPC valve 56*a*, activating, by a controller 84, shifting of the DP valve 57 to the closed position 86 to shift to or maintain the FMR valve 74 in a failure position 82 that disengages the clutch element 56*a*, the transmission of torque along the first torque path 38*a* interrupted when the FMR valve 74 is in the failure position 82, wherein the failed condition is when the clutch valve 56*a* is in the open position 58 without a command from the controller 84.

INDUSTRIAL APPLICABILITY

In general, the teachings of the present disclosure may find applicability in many industries including, but not limited to, construction, agricultural, mining, industrial, commercial, transportation, or marine applications. More specifically, the teachings of the present disclosure may find applicability in any industry relying on transmissions with hydraulically-actuated clutch elements.

The hydraulic control system 47 disclosed herein includes a FMR valve 74 to block transmission of torque along a torque path 38*a* when an actuation valve (CPC valve 38*a*) of a (single and only) clutch element 44*a* in the first torque path 38*a* is failed to an open position 58 without a command from the controller 84. With the FMR valve 74 in the failure position 82, uncommanded engagement of the clutch element 44*a* and resulting undesired machine 10 motion is prevented. In the failure position 82, the FMR valve 74 obstructs the flow of hydraulic fluid from the CPC valve 38*a* to the clutch actuator 48*a*, while simultaneously permitting the flow of hydraulic fluid from the clutch actuator 48*a* to a hydraulic fluid sump 72 to allow disengagement of the clutch element 44*a*. The DP valve 57 is used to actuate or de-actuate the FMR valve 74 and allows the use of a single clutch element 44*a* in the torque path 38*a*, without the need for a second clutch element to interrupt the torque path 38*a* in the case of failure of the CPC valve 56*a*, while eliminating the need for use of a solenoid activated valve for the FMR valve 74. As such, packaging space and manufacturing costs for the transmission may be reduced.

Figure 10:
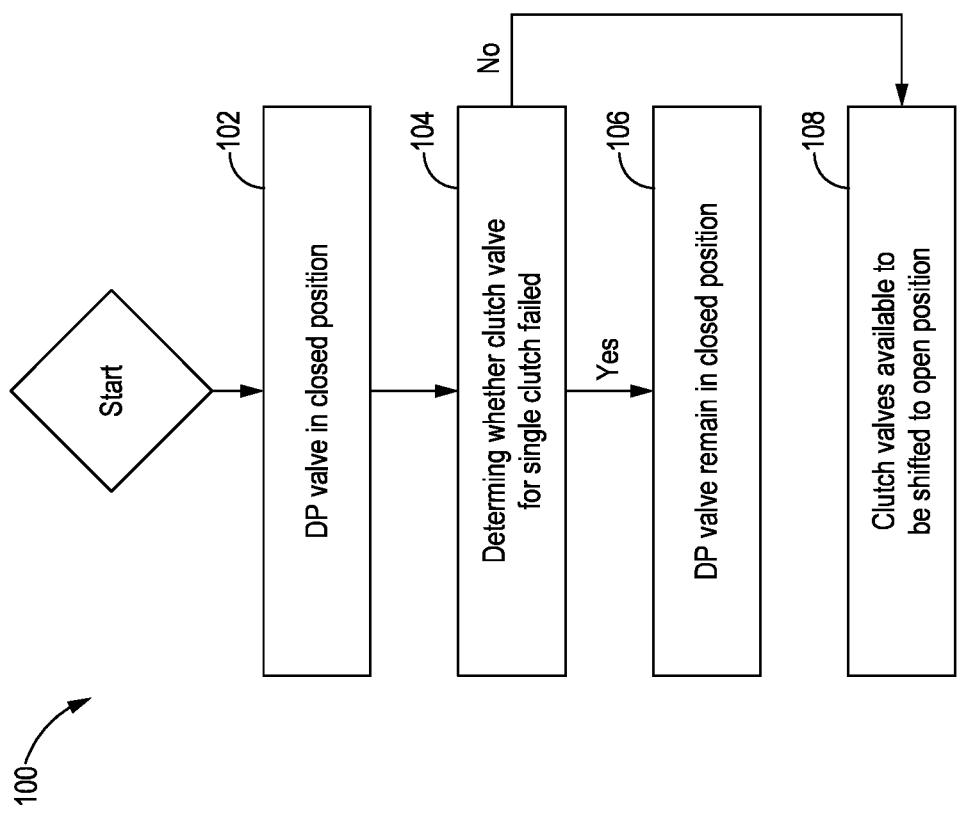
FIG. 10 is a flowchart of an exemplary method for controlling the clutch element when starting up the machine, in accordance with a method of the present disclosure.

Referring now to FIG. 10 an exemplary flowchart is illustrated showing sample blocks which may be followed in a method 100 of controlling the clutch element 44*a* of torque path 38*a* using the (hydraulic) control system 47 when starting up the machine 10. Upon start-up of the machine 10, the controller 84 may command the DP valve 57 to be in the closed position 86 by default so that the FMR valve 74 is in the failure position 82 by default according to block 102. At a next block 104, the controller 84 may determine if the CPC valve 56*a* is in the failed condition according to signals received from the sensor(s) 88. For example, the pressure sensor 96 may send signals to the controller 84 indicating that hydraulic fluid pressure exists in the control pressure line 62, and the controller 84 may then determine that the CPC valve 56*a* is in the failed condition if the CPC valve 56*a* is not currently being energized to be in the open position 58 by the controller 84. If the controller 84 determines that the CPC valve 56*a* is in the failed condition, the controller 84 may cause the DP valve 57 to remain in the closed position 86 so that the FMR valve 74 remains in the failure position 82 (block 106) and torque path 38*a* is blocked (as are torque paths 38*b* and 38*d* by the DP valve 57 being in the closed position 86). If the controller 84 determines that the CPC valve 56*a* is not in the failed condition, the controller 84 will allow the respective combinations of (1) DP valve 57 and CPC valve 56*a*, or (2) DP valve 57 and CPC valve 56*c* or (3) DP valve 57 and CPC valve 56*e* or (4) CPC valve 56*d* and CPC valve 56*c* or (5) CPC valve 56*c* and CPC valve 56*d* to be shifted to the open position 58 for the requested speed and direction. Shifting of the DP valve 57 to the open position 58 will allow the FMR valve 74 to shift to the normal position 76 and the single clutch element 44*a* to shift to the engaged position 51 (and torque to be transmitted on the first torque path 38*a* in the event that the CPC valve 56*a* is actuated). With the FMR valve 74 in the normal position 76, the transmission of torque along the torque path 38a is uninterrupted upon engagement of the clutch element 44a.

Turning to FIG. 11, an exemplary flowchart is illustrated showing sample blocks which may be followed in a method 100 of controlling the clutch element 44a using the control system 47 during operation of the machine 10. The DP valve 57 may be in the open position 58 to provide pilot hydraulic pressure to the FMR valve 74 to move to or maintain the normal position 76, allowing the CPC valve 56a to actuate engagement of the clutch element 44a according to commands from the controller 84. With the FMR valve 74 in the normal position 76, the transmission of torque along the torque path 38a may be uninterrupted upon commanded engagement of the clutch element 44a. At block 202, the controller 84 may determine if the CPC valve 56a is in the failed condition according to signals received from the sensor(s) 88. If it is determined that the CPC valve 56a is in the failed condition, the controller 84 may shift the DP valve 57 to the closed position 86 to block pilot pressure to the FMR Valve 74 and cause the FMR valve 74 to shift to the failure position 82, thereby halting or preventing uncommanded engagement of the clutch element 44a and uncommanded motion of the machine 10 (block 204) and also preventing transmission of torque on torque paths 38b and 38d. If it is determined that the CPC valve 56a is not in the failed condition, the clutch valves 56a may remain in the open position 58 and the FMR valve 74 may remain in the normal position 76 (block 206).

What is claimed is:

1. A transmission for a machine, comprising:
    an input shaft rotationally coupled to a power source;
    an output shaft;
    a first torque path configured to provide a first path for transmission of torque at a first torque path gear ratio from the input shaft to the output shaft;
    a first clutch element disposed on the first torque path, the first clutch element moveable between an engaged position and a disengaged position, the first clutch element configured to permit the transmission of torque from the input shaft to the output shaft when in the engaged position, the first clutch element further configured to block the transmission of torque from the input shaft to the output shaft when in the disengaged position, wherein the first clutch element is the only clutch element disposed on the first torque path;
    a first clutch actuator configured to actuate shifting of the first clutch element between the engaged position and the disengaged position;
    a first clutch valve having an open position and a closed position, the first clutch valve configured to permit when in the open position a flow of hydraulic fluid to the first clutch actuator through a first control pressure line to cause the first clutch actuator to shift the first clutch element to the engaged position;
    a failure mode response (FMR) valve in the first control pressure line between the first clutch valve and the first clutch actuator, the FMR valve having a normal position that permits hydraulic fluid received from the first clutch valve to flow to the first clutch actuator when the first clutch valve is in the open position, and a failure position that obstructs the flow of the hydraulic fluid received from the first clutch valve to the first clutch actuator when the first clutch valve is in the open position, wherein the transmission of torque along the first torque path is interrupted when the FMR valve is in the failure position;
    a second torque path configured to provide a second path for transmission of torque at a second torque path gear ratio from the input shaft to the output shaft, wherein a portion of the second torque path is different than the first torque path;
    a second clutch element moveable between an engaged position and a disengaged position, the second clutch element disposed on the portion of the second torque path that is different than the first torque path, the second clutch element configured to permit the transmission of torque from the input shaft along the second torque path when in the engaged position, the second clutch element further configured to block the transmission of torque from the input shaft on the second torque path when the second clutch element is in the disengaged position;
    a second clutch actuator configured to actuate shifting of the second clutch element between the engaged position and the disengaged position;
    a dual-purpose valve having an open position and a closed position, the dual-purpose valve configured to:
        (a) permit, when in the open position, hydraulic fluid to flow: (i) to the second clutch actuator through a second control pressure line to cause the second clutch actuator to shift the second clutch element to the engaged position and (ii) to the FMR valve through a pilot line to shift the FMR valve to the normal position and;
        (b) to obstruct, when in the closed position, the flow of hydraulic fluid: (i) to the second clutch actuator through the second control pressure line to cause the second clutch actuator to shift the second clutch element to the disengaged position and (ii) to the FMR valve through the pilot line to shift the FMR valve to the failure position, wherein transmission of torque from the input shaft to the output shaft is blocked along the first torque path when dual-purpose valve is in the closed position and transmission of torque from the input shaft through the second clutch element is blocked when the dual-purpose valve is in the closed position.

2. The transmission of claim 1, further comprising a controller in communication with the first clutch valve and dual-purpose valve, the controller configured to:
    shift the first clutch valve to the open position to move the first clutch element to the engaged position, and shift the first clutch valve to the closed position to move the first clutch element to the disengaged position.

3. The transmission of claim 2, wherein the controller is further configured to: upon detecting a failed condition of the first clutch valve, shift the dual-purpose (DP) valve to the closed position, the first clutch valve being in the failed condition when the first clutch valve is in the open position without a command from the controller.

4. The transmission of claim 3, further comprising a sensor in communication with the controller, the controller configured to determine whether the first clutch valve is in the failed condition based on data received from the sensor.

5. The transmission of claim 3, wherein the controller is further configured to maintain the DP valve in the closed position during startup of the transmission.

6. The transmission of claim 5, wherein the FMR valve is in the failure position by default during startup.

7. The transmission of claim 4, wherein the sensor is a pressure sensor.

8. A method for hydraulically controlling a first clutch element along a first torque path of a transmission of a machine, the transmission including the first clutch element disposed on the first torque path from an input shaft to an output shaft; a second clutch element disposed on a second torque path from the input shaft to the output shaft, wherein the second clutch element is disposed on a portion of the second torque path that is different than the first torque path, a failure mode response (FMR) valve disposed between a first clutch valve and a first clutch actuator, the FMR valve having a normal position that permits hydraulic fluid received from the first clutch valve to flow to the first clutch actuator to engage the first clutch element when the first clutch valve is in an open position, and a failure position that obstructs the flow of the hydraulic fluid received from the first clutch valve to the first clutch actuator when the first clutch valve is in the open position, while simultaneously allowing flow from the first clutch actuator to a hydraulic fluid sump, wherein the transmission of torque along the first torque path is interrupted when the FMR valve is in the failure position, and a dual-purpose (DP) valve configured to:
- (a) permit, when in the open position, hydraulic fluid to flow: (i) to shift the second clutch element to an engaged position that permits transmission of torque along the second torque path at a second torque path gear ratio and (ii) to shift the FMR valve to the normal position and;
- (b) to obstruct, when in a closed position, the flow of hydraulic fluid: (i) to shift the second clutch element to the disengaged position that blocks transmission of torque along the second torque path and (ii) to shift the FMR valve to the failure position to disengage the first clutch element and block the transmission of torque on the first torque path, the method comprising:
upon detecting a failed condition of the first clutch valve, activating, by a controller, shifting of the DP valve to the closed position to shift to or maintain the FMR valve in a failure position that disengages the first clutch element, the transmission of torque along the first torque path interrupted when the FMR valve is in the failure position, wherein the failed condition is when the first clutch valve is in the open position without a command from the controller.

9. The method of claim 8 further comprising: shifting DP valve to the open position to shift the FMR valve to the normal position if the first clutch valve is not in the failed condition, the normal position of the FMR valve permitting the flow of the hydraulic fluid from the first clutch valve to the first clutch actuator when the first clutch valve is in the open position, the open position of the DP valve permitting fluid to flow to shift the second clutch element on the second torque path.

10. The method of claim 9, wherein the transmission further comprises a third clutch element disposed on the second torque path and a third clutch valve moveable between an open position and a closed position, the third clutch element disengaged when the third clutch valve is in the closed position, the method further comprising shifting the third clutch valve to the closed position when the first clutch valve is energized.

11. The method of claim 10, the method further comprising maintaining the DP valve in the closed position during startup of the machine.

12. The method of claim 11, wherein the FMR valve is in the failure position by default during startup.

13. The method of claim 10, wherein the transmission further includes a third torque path that is available for torque transmission from the input shaft to the output shaft when the DP valve is in the closed position and the FMR valve is in the failed position.

14. A system for controlling a clutch element of a transmission of a machine, the transmission including an output shaft, a first torque path configured to provide a first torque path for transmission of torque from an input shaft to the output shaft, a first clutch element disposed on the first torque path and moveable between an engaged position and a disengaged position, the first clutch element configured to permit transmission of torque from the input shaft to the output shaft when in the engaged position and to block transmission of torque from the input shaft to the output shaft when in the disengaged position, wherein the first clutch element is the only clutch element disposed on the first torque path, a second torque path configured to provide a second torque path for transmission of torque from the input shaft to the output shaft, wherein a portion of the second torque path is different than the first torque path, and a second clutch element moveable between an engaged position and a disengaged position, the second clutch element disposed on the portion of the second torque path that is different than the first torque path, the second clutch element configured to permit the transmission of torque from the input shaft along the second torque path when in the engaged position and to block the transmission of torque from the input shaft on the second torque path when the second clutch element is in the disengaged position, the system comprising:
a first clutch actuator configured to actuate shifting of the first clutch element between the engaged position and the disengaged position;
a first clutch pressure control (CPC) valve having an open position and a closed position, the first CPC valve configured to permit when in the open position a flow of hydraulic fluid to the first clutch actuator through a first control pressure line to cause the first clutch actuator to shift the first clutch element to the engaged position;
a failure mode response (FMR) valve in the first control pressure line between the first CPC valve and the first clutch actuator, the FMR valve having a normal position that permits hydraulic fluid received from the first CPC valve to flow to the first clutch actuator when the first CPC valve is in the open position, and a failure position that obstructs the flow of the hydraulic fluid received from the first CPC valve to the first clutch actuator when the first CPC valve is in the open position, while simultaneously allowing flow from the first clutch actuator to a hydraulic fluid sump, wherein the transmission of torque along the first torque path is interrupted when the FMR valve is in the failure position;
a second clutch actuator configured to actuate shifting of the second clutch element between the engaged position and the disengaged position;
a dual purpose (DP) valve having an open position and a closed position, the dual purpose valve configured to:
(a) permit, when in the open position, hydraulic fluid to flow: (i) to the second clutch actuator through a second control pressure line to cause the second clutch actuator to shift the second clutch element to the engaged position and (ii) to the FMR valve through a pilot line to shift the FMR valve to the normal position and;
(b) to obstruct, when in the closed position, the flow of hydraulic fluid: (i) to the second clutch actuator through the second control pressure line to cause the second clutch actuator to shift the second clutch element to the disengaged position and (ii) to the FMR valve through the pilot line to shift the FMR valve to the failure position, wherein transmission of torque from the input shaft to the output shaft is blocked along the first torque path when the dual purpose valve is in the closed position and transmission of torque from the input shaft through the second clutch element is blocked when the dual purpose valve is in the closed position; and a controller in communication with the first clutch valve and dual-purpose valve, the controller configured to:

shift the first clutch valve to the open position to move the first clutch element to the engaged position, and shift the first clutch valve to the closed position to move the first clutch element to the disengaged position; and upon detecting a failed condition of the first clutch valve, shift the dual-purpose valve to the closed position, the first clutch valve being in the failed condition when the first clutch valve is in the open position without a command from the controller.

15. The system of claim 14, wherein the CPC valve is in the failed condition when the CPC valve is in the open position without a command from the controller.

16. The system of claim 15, further comprising:

a third torque path configured to provide a third path for transmission of torque from the input shaft to the output shaft, wherein at least a portion of the third torque path is different than the first torque path and is different from the second torque path;

a third clutch element moveable between an engaged position and a disengaged position, the third clutch element disposed on the portion of the third torque path that is different than the first torque path and is different than the second torque path, the third clutch element configured to permit the transmission of torque from the input shaft along the third torque path when in the engaged position, the third clutch element further configured to block the transmission of torque from the input shaft on the third torque path when the third clutch element is in the disengaged position; and a third clutch actuator configured to actuate shifting of the third clutch element between the engaged position and the disengaged position.

17. The system of claim 16, wherein transmission of torque from the input shaft along the third torque path is not blocked when the dual-purpose valve is in the closed position.

18. The system of claim 14, in which the controller is further configured to maintain the DP valve in the closed position during startup of the machine.

19. The system of claim 18, wherein the FMR valve is in the failure position during startup of the machine.

20. The system of claim 19 further comprising a sensor in communication with the controller, the controller configured to determine whether the first clutch valve is in the failed condition based on data received from the sensor.

* * * * *